United States Patent
Shimizu (10) Patent No.: US 7,613,375 B2
(45) Date of Patent: Nov. 3, 2009

(54) OPTICAL WAVEGUIDE FOR TOUCH PANEL

(75) Inventor: Yusuke Shimizu, Ibaraki (JP)

(73) Assignee: Nitto Denko Corporation, Ibaraki-Shi (JP)

( * ) Notice: Subject to any disclaimer, the term of this patent is extended or adjusted under 35 U.S.C. 154(b) by 2 days.

(21) Appl. No.: 12/020,304

(22) Filed: Jan. 25, 2008

(65) Prior Publication Data

US 2008/0181566 A1    Jul. 31, 2008

Related U.S. Application Data

(60) Provisional application No. 60/951,004, filed on Jul. 20, 2007.

(30) Foreign Application Priority Data

Jan. 25, 2007  (JP)  ............................. 2007-015292

(51) Int. Cl.
  *G02B 6/10*   (2006.01)
  *G09G 5/00*   (2006.01)

(52) U.S. Cl. .................. 385/129; 345/175; 345/176; 345/177; 345/179; 365/4; 365/132

(58) Field of Classification Search ............. 385/129; 345/173–179
See application file for complete search history.

(56) References Cited

U.S. PATENT DOCUMENTS

| 2002/0088930 | A1 | 7/2002 | Graham et al. |
| 2004/0201579 | A1 | 10/2004 | Graham |
| 2005/0089298 | A1 | 4/2005 | Maxwell et al. |
| 2006/0001653 | A1* | 1/2006 | Smits ................ 345/176 |
| 2006/0002655 | A1 | 1/2006 | Smits |
| 2007/0285406 | A1* | 12/2007 | Kukulj et al. ........... 345/176 |

FOREIGN PATENT DOCUMENTS

EP       1701188 A1    9/2006
WO   2004/001463 A1   12/2003

OTHER PUBLICATIONS

European Search Report dated Jul. 20, 2009, issued in corresponding European Patent Application No. 08001345.

* cited by examiner

*Primary Examiner*—Tina M Wong
(74) *Attorney, Agent, or Firm*—Westerman, Hattori, Daniels & Adrian, LLP (57) ABSTRACT

An optical waveguide for a touch panel which obviates a need for positioning a light receiving optical waveguide portion. The touch panel optical waveguide A1 which is to be fitted around a periphery of a display screen of a display of a touch panel, the optical waveguide comprising light emitting cores 3 each having an end face provided on one of opposed portions disposed in opposed relation on opposite sides of the display screen of the display, and light receiving cores 3 each having an end face provided on the other of the opposed portions, wherein the cores 3 are provided on a surface of a planar frame-shaped under-cladding layer (frame) 2 having a shape conformable to the periphery of the display screen of the display.

2 Claims, 7 Drawing Sheets

PRIOR ART

OPTICAL WAVEGUIDE FOR TOUCH PANEL

RELATED APPLICATIONS

This application claims the benefit of U.S. Provisional Application No. 60/951,004, filed Jul. 20, 2007, which is hereby incorporated by reference.

BACKGROUND OF THE INVENTION

1. Field of the Invention

The present invention relates to an optical waveguide for a touch panel.

2. Description of the Related Art

Touch panels are input devices for operating an apparatus by directly touching a display screen of a liquid crystal display device or the like by a finger, a special stylus or the like, and include a display which displays operation items, and detection means which detects the position (coordinates) of a portion of the display screen of the display touched by the finger or the like. Information of the touch position detected by the detection means is sent in the form of a signal to the apparatus, which in turn performs an operation specified by the touch position. Examples of the apparatus employing such a touch panel include ATMs in banking facilities, ticket venders in stations and portable game machines.

Figure 8:
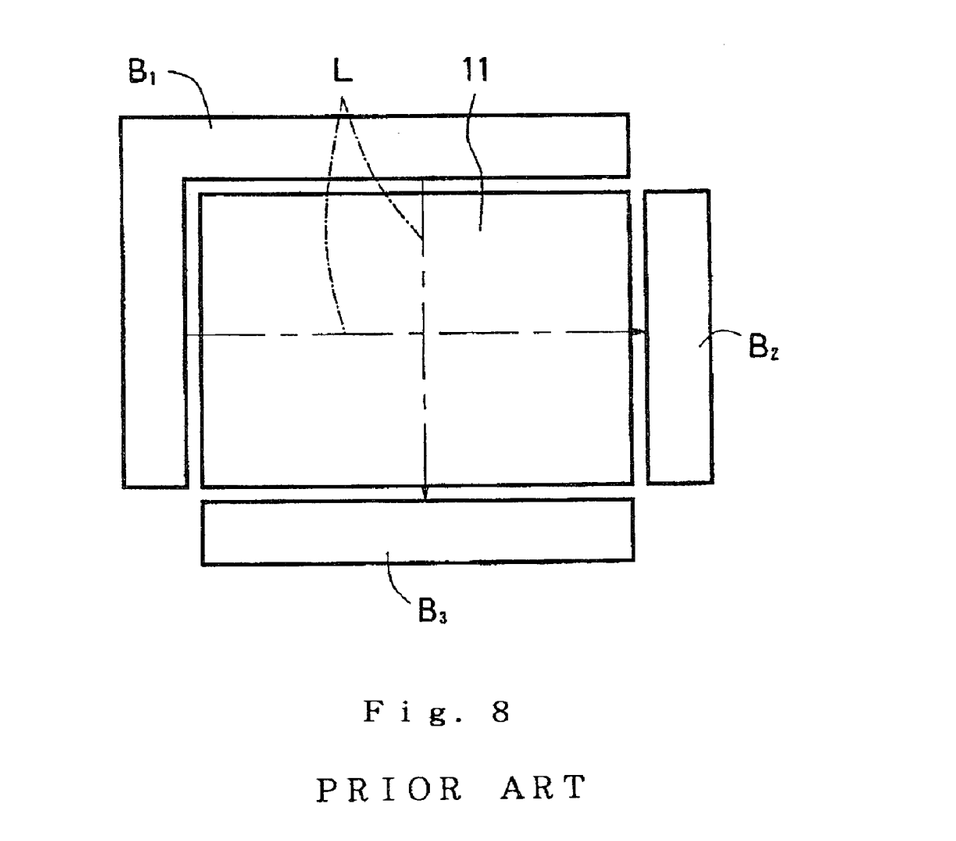
FIG. 8 is a plan view illustrating a prior art touch panel.

A detection device employing an optical waveguide is proposed as the detection means for detecting the finger touch position on the touch panel (see, for example, US 2004/0201579A1). As shown in FIG. 8, the optical waveguide is fitted around a periphery of a display screen of a rectangular display, and includes an L-shaped optical waveguide $B_1$ and two linear optical waveguides $B_2$, $B_3$ respectively opposed to linear portions of the L-shaped optical waveguide $B_1$. A multiplicity of light emitting cores which respectively emit light beams L parallel to the display screen of the display 11 are disposed in the liner portions of the L-shaped optical waveguide $B_1$. A multiplicity of light receiving cores which respectively receive the light beams L emitted from the light emitting cores are disposed in the linear optical waveguides $B_2$, $B_3$ respectively opposed to the linear portions of the L-shaped optical waveguide $B_1$. Thus, these three optical waveguides $B_1$, $B_2$, $B_3$ cause the light beams L to travel in a lattice form on the display screen of the display 11. When a portion of the display screen of the display 11 is touched by the finger in this state, the finger blocks some of the light beams L. Therefore, the position of the portion touched by the finger is detected by detecting a light blocked portion by the optical waveguides $B_2$, $B_3$.

In the touch panel of the above-mentioned Patent Document, however, the L-shaped optical waveguide $B_1$ which emits the light beams L and the two linear optical waveguides $B_2$, $B_3$ which receive the light beams are separately provided. Therefore, unless the two linear optical waveguides $B_2$, $B_3$ are accurately positioned with respect to the L-shaped optical waveguide $B_1$, the optical waveguides $B_2$, $B_3$ cannot receive the light beams L, and the touch panel fails to function as the detection means. In addition, end faces of the respective cores serving as light outlet and inlet ports each have a very small size, so that the positioning is time-consuming.

In view of the foregoing, it is an object of the present invention to provide an optical waveguide for a touch panel which obviates the need for positioning the light receiving optical waveguides.

SUMMARY OF THE INVENTION

To achieve the aforementioned object, an inventive optical waveguide for a touch panel is a touch panel optical waveguide which is to be fitted around a periphery of a display screen of a display of a touch panel, and comprises: a unitary planar frame having a shape conformable to the periphery of the display screen of the display, and including frame portions to be disposed in opposed relation on opposite sides of the display screen of the display and respectively having inner surfaces opposed to each other; light emitting cores provided on one of the frame portions and each light emitting core having an end face exposed on the inner surface of the one frame portion for emitting light beams; and light receiving cores provided on an other of the frame portions disposed in opposed relation to said one frame portion and each light receiving core having an end face exposed on the inner surface of the other frame portion for receiving the light beams emitted from the light emitting cores; wherein the light emitting cores and the light receiving cores are disposed on a surface of the unitary planar frame.

In the inventive touch panel optical waveguide, the light emitting cores and the light receiving cores are provided on the surface of the unitary planar frame. Therefore, the optical waveguide is produced with optical axes of the light emitting cores being aligned with optical axes of the light receiving cores. This obviates the need for the positioning of the light receiving cores when the touch panel optical waveguide is fitted around the periphery of the display screen of the display of the touch panel.

DETAILED DESCRIPTION OF THE PREFERRED EMBODIMENTS

Embodiments of the present invention will hereinafter be described in detail with reference to the drawings.

Figure 1A:
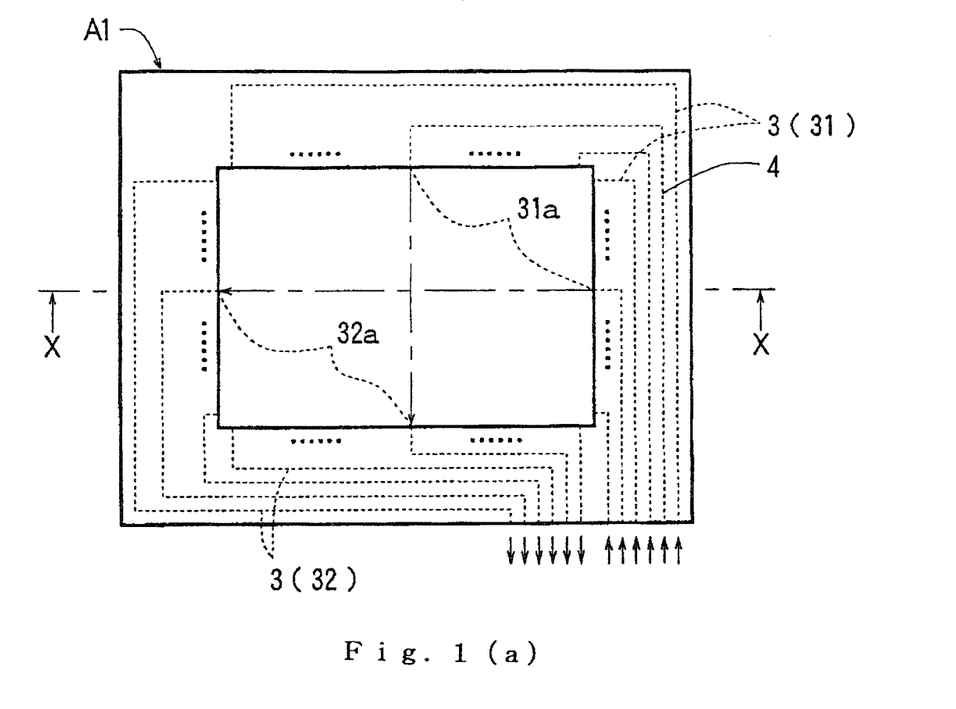
FIGS. 1(a) and 1(b) are a plan view and an X-X sectional view schematically illustrating an optical waveguide according to one embodiment of the present invention.
Figure 1B:
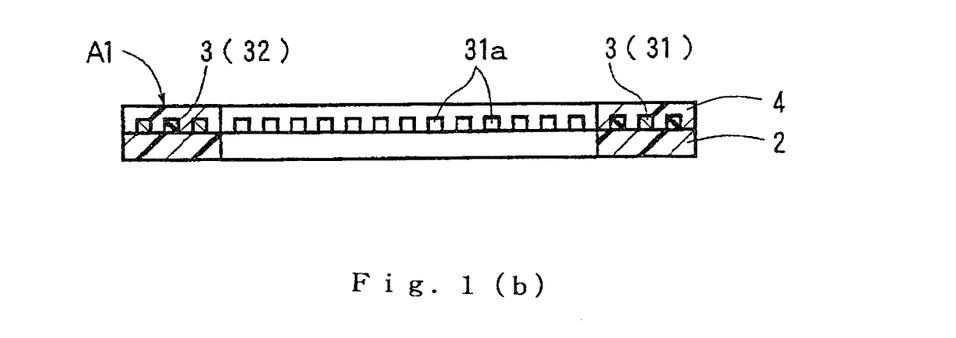
Figure 2:
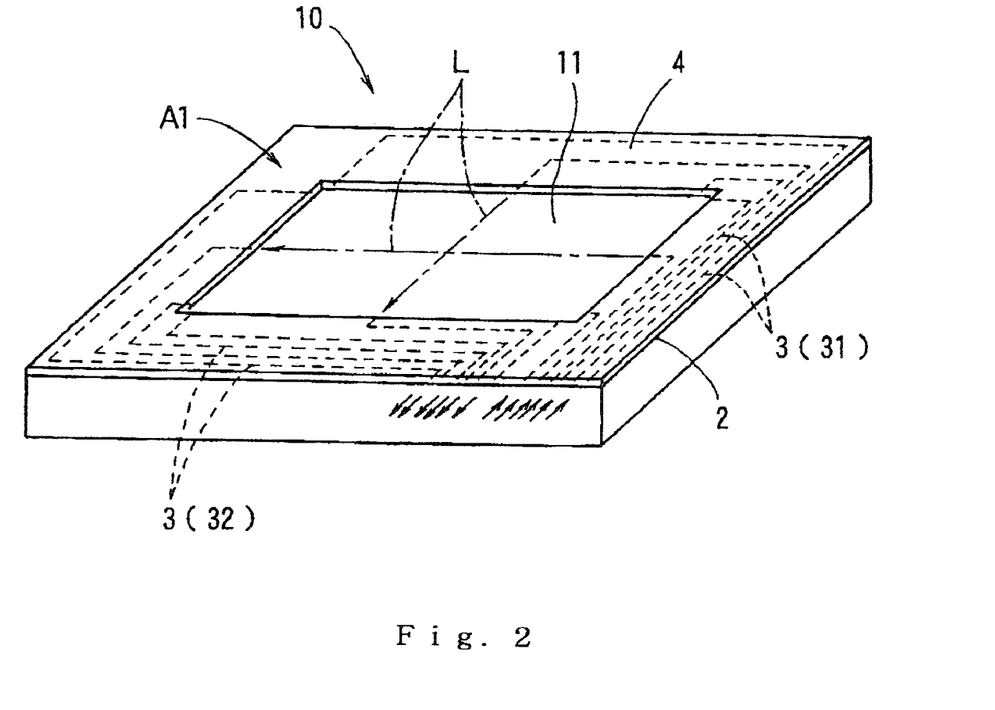
FIG. 2 is a perspective view schematically illustrating a touch panel employing the optical waveguide.

FIGS. 1(a) and 1(b) illustrate an optical waveguide for a touch panel according to one embodiment of the present invention. The touch panel optical waveguide A1 (hereinafter referred to simply as "optical waveguide") according to this embodiment is configured in a rectangular planar frame shape, and includes a plurality of cores 3 enclosed by an under-cladding layer 2 and an over-cladding layer 4. As shown in FIG. 2, the optical waveguide is fitted around a periphery of a display screen of a rectangular display 11 of the touch panel 10 for use. That is, the under-cladding layer (frame) 2 is a unitary continuous frame configured in a rectangular planar frame shape which is conformable to a rectangular periphery of the display screen of the display 11. The plurality of cores 3 are provided in a predetermined pattern on a surface of the planar frame-shaped under-cladding layer 2. The over-cladding layer 4 also has a rectangular planar frame shape, and is provided on the under-cladding layer 2 to cover the cores 3. In FIGS. 1(a) and 2, the cores 3 are indicated by broken lines, and the thicknesses of the broken lines correspond to the thicknesses of the cores 3. In FIGS. 1(a) and 1(b), some of the cores 3 are not shown. This is true for the subsequent drawings.

In this embodiment, more specifically, the pattern of the cores 3 is configured such that the cores 3 are divided into equal numbers of light emitting cores 31 and light receiving cores 32, which are respectively provided in two L-shaped planar portions of the rectangular planar frame-shaped optical waveguide A1 as extending from an outer side of one corner of the optical waveguide A1 to inner edges of the optical waveguide (on the side of the display screen of the display 11) in equidistantly juxtaposed relation as shown in FIGS. 1(a) and 1(b). End faces 31a of the light emitting cores 31 are exposed on one of opposed inner surfaces of the L-shaped planar portions, and end faces 32a of the light receiving cores 32 are exposed on the other inner surface. The end faces 31a of the light emitting cores 31 are respectively opposed to the end faces 32a of the light receiving cores 32 with optical axes of the light emitting cores 31 being respectively aligned with optical axes of the light receiving cores 32, so that light beams emitted from the end faces 31a of the light emitting cores 31 travel as shown by one-dot-and-dash lines in FIG. 1(a) to be incident on the end faces 32a of the light receiving cores 32. The end faces 31a, 32a of the light emitting cores 31 and the light receiving cores 32 are each bulged in an arcuate shape as seen in plan (not shown), and each serve as a lens to suppress diffusion of the light beams during light emission. In FIG. 1(a), arrows shown in the vicinity of end faces of the cores 3 at the one corner of the optical waveguide A1 indicate the traveling directions of the light beams.

As shown in FIG. 2, the rectangular planar frame-shaped optical waveguide A1 is fitted around the periphery of the rectangular display screen of the display 11 of the touch panel 10. A light source (not shown) is connected to the light emitting cores 31 provided in the one L-shaped planar portion, while a detector (not shown) is connected to the light receiving cores 32 provided in the other L-shaped planar portion. In FIG. 2, arrows shown in the vicinity of end faces of the cores 3 at the one corner of the optical waveguide A1 indicate the traveling directions of the light beams L.

In the rectangular planar frame-shaped optical waveguide A1, the light beams L are emitted from the light emitting cores 31 provided in the one L-shaped planar portion, and travel as indicated by the one-dot-and-dash lines in FIGS. 1(a) and 2 to be incident on the light receiving cores 32 provided in the other L-shaped planar portion. Thus, the light beams L travel in a lattice form on the display screen of the display 11. When a portion of the display screen of the display 11 is touched by a finger in this state, the finger blocks some of the light beams L. Therefore, the position of the portion touched by the finger is detected by detecting a light blocked portion by the light receiving cores 32 of the optical waveguide A1. In FIG. 2, the light beams L are partly shown.

The size of the optical waveguide A1 is not particularly limited, but may conform to the size of the display 11 of the touch panel 10. For example, the length and the width of the optical waveguide A1 are about 30 to about 300 mm, and the widths of the planar frame portions are about 30 to about 150 mm. Further, the number of the light emitting cores 31 (the light receiving cores 32) provided on each inner edge of the optical waveguide A1 (the number of light beams emitted from each inner edge) is not particularly limited, but may be determined according to the number of operation items to be displayed on the display screen of the display 11, for example, 20 to 100.

Next, an exemplary production method for the optical waveguide A1 will be described.

Figure 3:
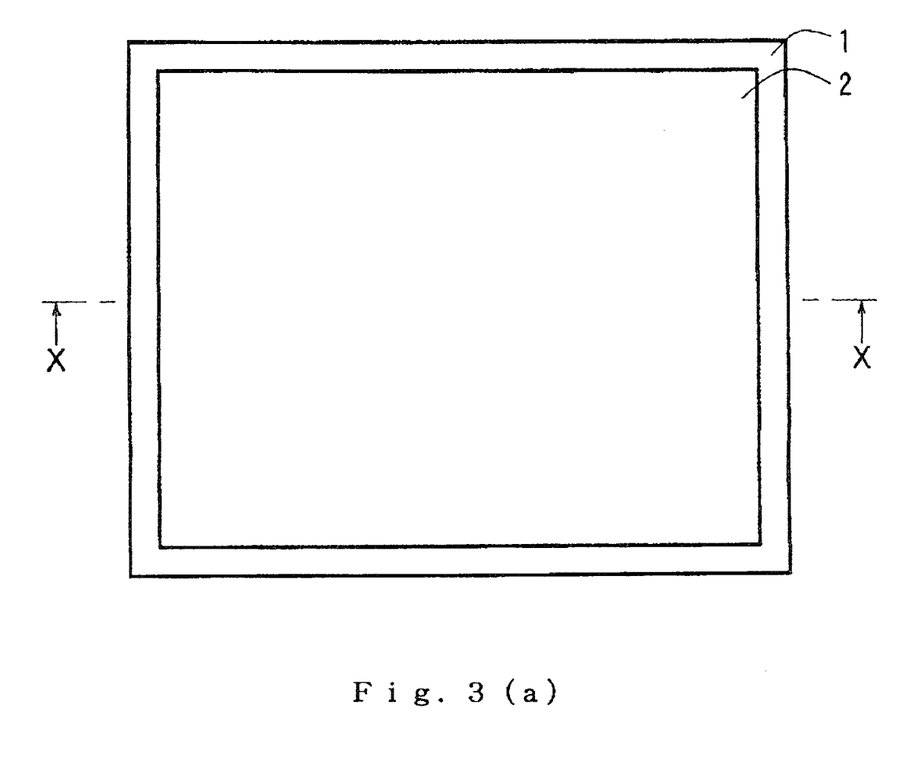
FIGS. 3(a) and 3(b) are a plan view and an X-X sectional view schematically showing a production method for the optical waveguide.

As shown in FIGS. 3(a) and 3(b), a base 1 for the production of the optical waveguide A1 (see FIGS. 1(a) and 1(b)) is first prepared. A material for the formation of the base 1 is not particularly limited, but examples thereof include resins, glass, silicon and metals. Examples of the resins include polyethylene naphthalates, polyesters, polyacrylates, polycarbonates, polynorbornenes and polyimides. The thickness of the base 1 is not particularly limited, but is typically in the range of 20 µm (for a film-like base 1) to 5 mm (for a plate-like base 1).

In turn, an under-cladding layer 2 is formed on a predetermined region of a surface of the base 1. Examples of a material for the formation of the under-cladding layer 2 include polyimide resins, epoxy resins, photopolymerizable resins and photosensitive resins. The method for the formation of the under-cladding layer 2 is not particularly limited, but the formation may be achieved, for example, by applying a varnish prepared by dissolving the aforementioned resin in a solvent onto the base, and then curing the varnish. The application of the varnish is achieved, for example, by a spin coating method, a dipping method, a casting method, an injection method, an ink jet method or the like. The curing is carried out as appropriate depending on the material for the formation of the under-cladding layer 2 and the thickness of the under-cladding layer 2 and the like. Where the under-cladding layer 2 is formed of a polyimide resin, for example, the curing is achieved by a heat treatment at 300° C. to 400° C. for 60 to 180 minutes. Where the under-cladding layer 2 is formed of a photopolymerizable resin, the curing is achieved by irradiation with ultraviolet radiation at 1000 to 5000 mJ/cm$^2$ followed by a heat treatment at 80° C. to 120° C. for 10 to 30 minutes. The thickness of the under-cladding layer 2 is typically 5 to 50 µm for a multimode optical waveguide A1, and 1 to 20 µm for a single-mode optical waveguide A1.

Figure 4:
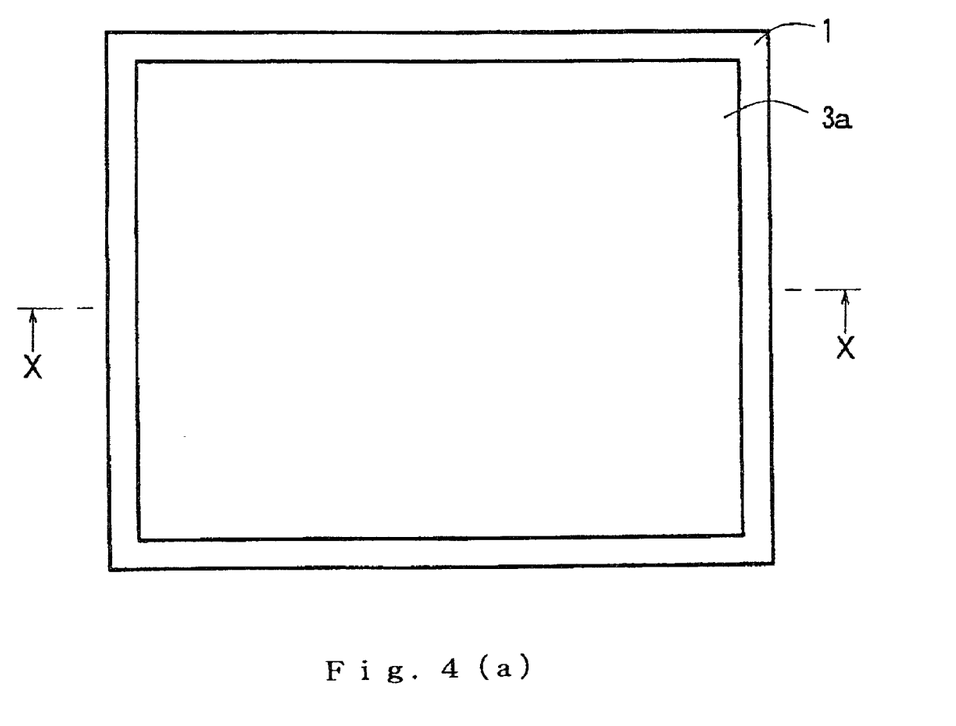
FIGS. 4(a) and 4(b) are a plan view and an X-X sectional view schematically showing the production method for the optical waveguide.

Next, as shown in FIGS. 4(a) and 4(b), a resin layer 3a later serving as cores 3 (see FIGS. 5(a) and 5(b)) is formed on a surface of the under-cladding layer 2. An exemplary material for the formation of the resin layer 3a is a photopolymerizable resin, which is a material having a greater refractive index than the materials for the formation of the aforementioned under-cladding layer 2 and an over-cladding layer 4 to be described later (see FIGS. 6(a) and 6(b)). The refractive index may be adjusted, for example, by selection of the types of the materials for the formation of the respective layers 2, 3, 4 and adjustment of the composition ratio thereof. The method for the formation of the resin layer 3a is not particularly limited, but the formation may be achieved in the same manner as described above, for example, by applying a varnish prepared by dissolving the photopolymerizable resin in a solvent onto the under-cladding layer 2, and then drying the varnish. The application of the varnish is achieved in the same manner as described above, for example, by a spin coating method, a dipping method, a casting method, an injection method, an ink jet method or the like. The drying is achieved by a heat treatment at 50° C. to 120° C. for 10 to 30 minutes.

Figure 5A:
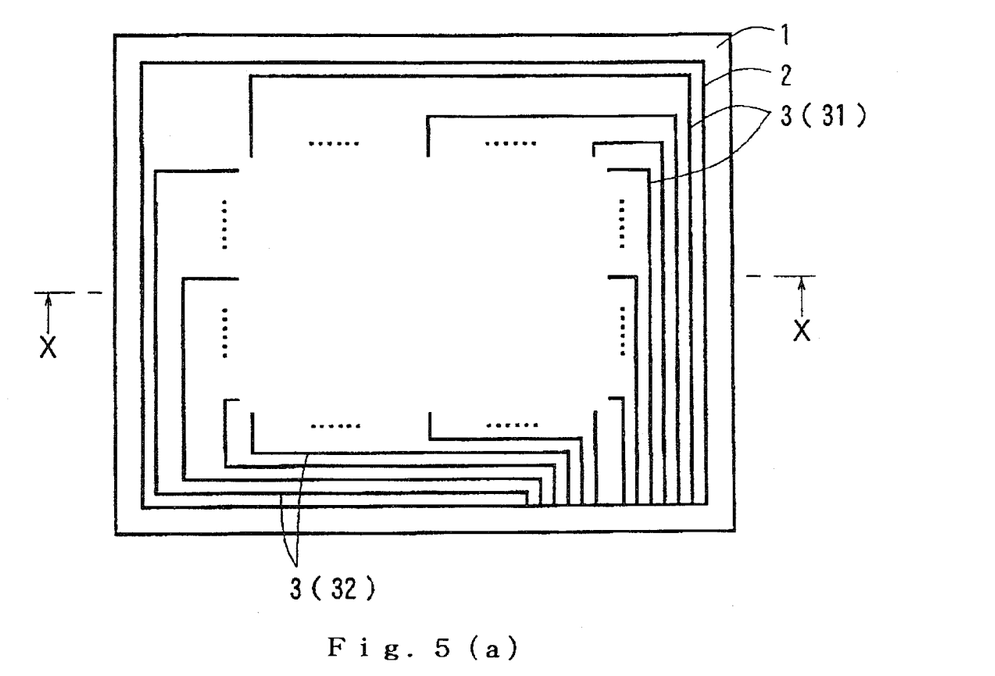
FIGS. 5(a) and 5(b) are a plan view and an X-X sectional view schematically showing the production method for the optical waveguide.
Figure 5B:
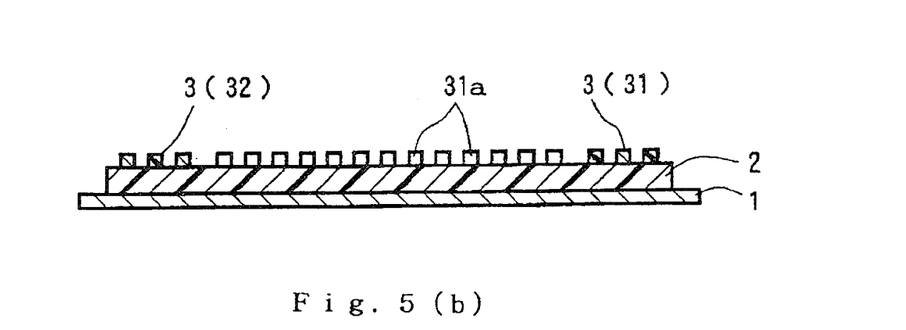

Then, the resin layer 3a is exposed to radiation through a photo mask formed with an opening pattern corresponding to a desired pattern of the cores 3 (see FIGS. 5(a) and 5(b)). Exposed portions of the resin layer later serve as the cores 3. In this embodiment, the pattern of the cores 3 is configured to be divided into two parts which are to be respectively disposed in the two L-shaped planar portions of the rectangular planar frame-shaped optical waveguide A1 (see FIG. 1(a)) as shown in FIG. 5(a). In addition, equal numbers of end faces of the cores 3 are opposed inside the planar frame-shaped optical waveguide with their optical axes aligned. Exemplary methods for the exposure include projection exposure, proximity exposure and contact exposure. Where the resin layer 3a is non-adhesive, a contact exposure method is preferably employed in which the photo mask is brought into contact with the resin layer 3a. This improves the operating efficiency and permits reliable patterning of a latent image. Examples of the radiation for the exposure include visible light, ultraviolet radiation, infrared radiation, X-rays, α-rays, β-rays and γ-rays. Preferably, the ultraviolet radiation is used. The use of the ultraviolet radiation permits irradiation at a higher energy to provide a higher curing speed. In addition, a less expensive smaller-size irradiation apparatus can be employed, thereby reducing production costs. Examples of a light source for the ultraviolet radiation include a low-pressure mercury-vapor lamp, a high-pressure mercury-vapor lamp and an ultra-high-pressure mercury-vapor lamp. The dose of the ultraviolet radiation is typically 10 to 10000 $mJ/cm^2$, preferably 50 to 3000 $mJ/cm^2$.

After the exposure, a heat treatment is performed to complete a photoreaction. The heat treatment is performed at 80° C. to 250° C., preferably at 100° C. to 200° C., for 10 seconds to two hours, preferably for five minutes to one hour. Thereafter, a development process is performed by using a developing solution to dissolve away an unexposed portion of the resin layer 3a, whereby the resin layer 3a is patterned (see FIGS. 5(a) and 5(b)). Then, the developing solution in the patterned resin layer 3a is removed by a heat treatment, whereby the pattern of the cores 3 is formed as shown in FIGS. 5(a) and 5(b). This heat treatment is typically performed at 80° C. to 120° C. for 10 to 30 minutes. The cores 3 typically each have 20 to 100 μm for the multimode optical waveguide A1, and 2 to 10 μm for the single-mode optical waveguide A1. Exemplary methods to be employed for the development include an immersion method, a spray method and a puddle method. Examples of the developing solution to be used include an organic solvent and an organic solvent containing an alkaline aqueous solution. The developing solution and conditions for the development are properly selected depending on the composition of the photopolymerizable resin.

Figures 6A, 6B:
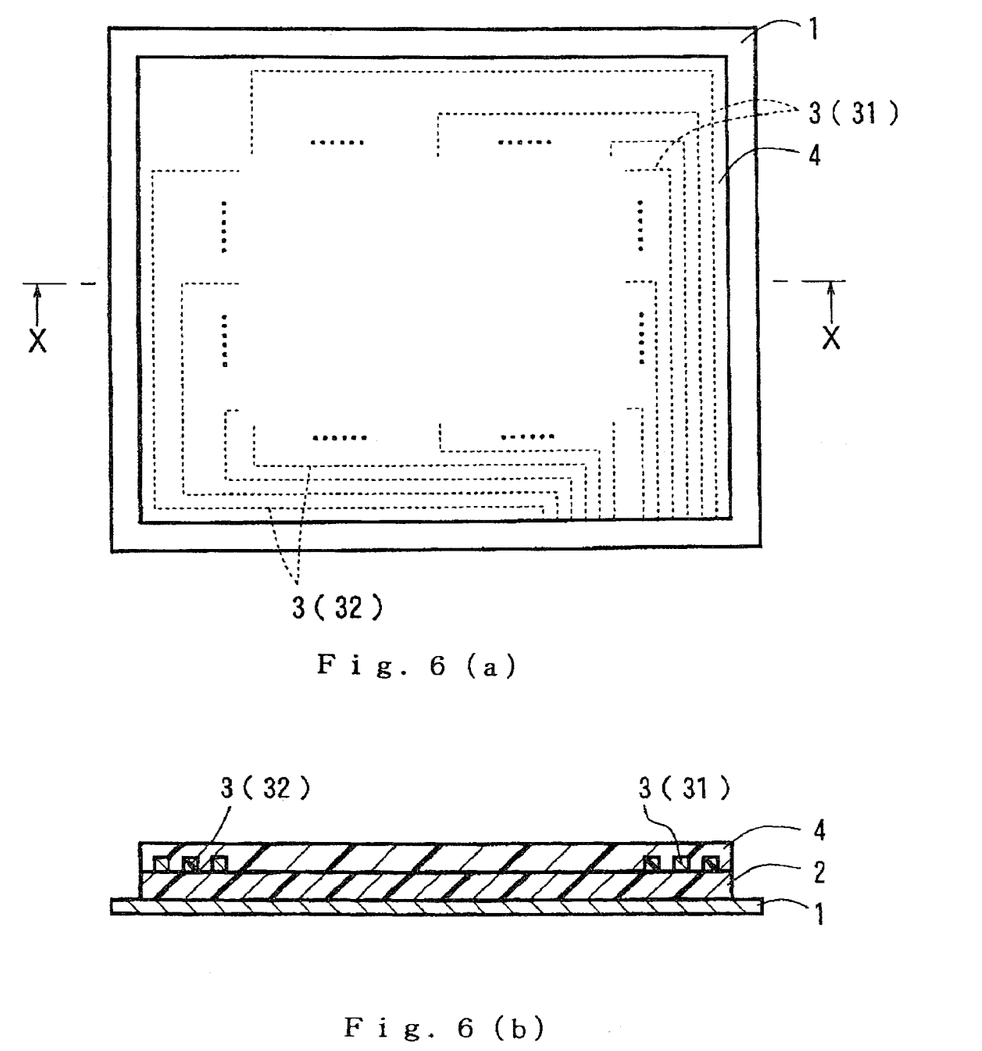
FIGS. 6(a) and 6(b) are a plan view and an X-X sectional view schematically showing the production method for the optical waveguide.

Next, as shown in FIGS. 6(a) and 6(b), an over-cladding layer 4 is formed as covering the aforementioned cores 3. Exemplary materials for the formation of the over-cladding layer 4 are those employed for the formation of the under-cladding layer 2. The material for the formation of the over-cladding layer 4 may be the same as or different from the material for the formation of the under-cladding layer 2. The formation of the over-cladding layer 4 may be achieved in the same manner as the formation of the under-cladding layer 2. The thickness of the over-cladding layer 4 is typically 5 to 100 μm for the multimode optical waveguide A1, and 1 to 20 μm for the single-mode optical waveguide A1.

Subsequently, the base 1 is removed from the under-cladding layer 2. The base 1 and the under-cladding layer 2 are bonded to each other with a small adhesive force because of their formation materials and, therefore, can be readily pulled apart from each other by air suction. Thereafter, a portion of the resulting product serving as the optical waveguide A1 is cut into a rectangular planar frame shape by stamping with a cutting die. Thus, the planar frame-shaped optical waveguide A1 shown in FIGS. 1(a) and 1(b) is provided.

Where a film base is employed as the base 1, the base 1 may be removed from the under-cladding layer 2 after the resulting product including the film base 1 is cut into the rectangular frame shape. Alternatively, the optical waveguide A1 may be used together with the base 1 without removal thereof.

Figure 7:
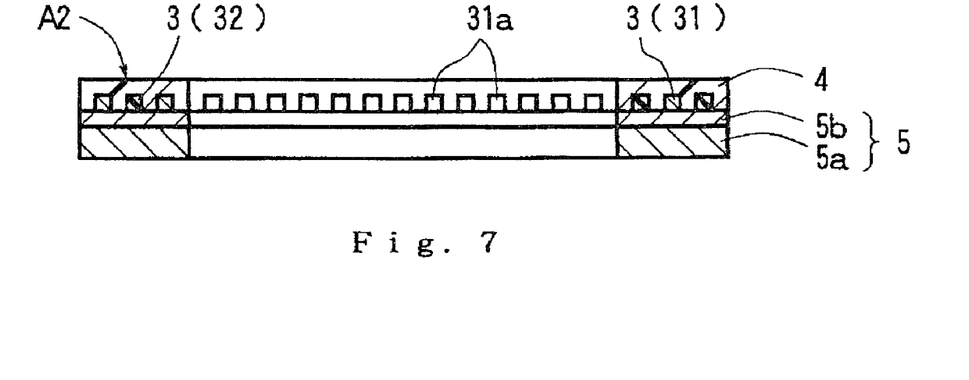
FIG. 7 is a sectional view schematically illustrating an optical waveguide according to another embodiment of the present invention.

FIG. 7 shows an optical waveguide according to another embodiment of the present invention. The optical waveguide A2 according to this embodiment is configured in substantially the same manner as in the aforementioned embodiment, except that a frame 5 includes a base 5a having a rectangular planar frame shape conformable to the periphery of the rectangular display screen of the display 11 (see FIG. 2) and a thin metal film 5b provided on a surface of the base 5a, and the cores 3 and the over-cladding layer 4 are provided on a surface of the thin metal film 5b. The thin metal film 5b serves as a reflective layer which reflects light beams passing through the cores 3. Therefore, like components will be denoted by like reference characters.

More specifically, the base 5a is not particularly limited, but examples thereof include a resin substrate, a glass substrate, and a silicon substrate. Exemplary materials for formation of the resin base include polyethylene naphthalates, polyesters, polyacrylates, polycarbonates, polynorbornenes and polyimides. The thickness of the base 5a is not particularly limited, but is typically in the range of 2 mm to 5 mm.

Formation of the thin metal film 5b is achieved by plating or evaporation. Exemplary materials for the formation of the thin metal film 5b include nickel, copper silver, gold, chromium, aluminum, zinc, tin, cobalt, tungsten, platinum and palladium, and alloy materials containing two or more of these elements. The thickness of the thin metal film is not particularly limited, but is typically 50 nm to 5 μm.

In a production method for the optical waveguide A2, a rectangular planar frame-shaped base 5a is prepared, and a thin metal film 5b is formed on a surface of the base 5a by plating or evaporation. Then, cores 3 and a rectangular planar frame-shaped over-cladding layer 4 are formed on a surface of the thin metal film 5b in the same manner as described above. Thus, the optical waveguide A2 is provided.

In the embodiments described above, the over-cladding layer 4 is provided, but is not essential. In some cases, the optical waveguides may be each produced as having no over-cladding layer 4.

In the embodiments described above, the planar frame-shaped optical waveguides A1, A2 each have a rectangular shape. However, the shapes of the optical waveguides are not particularly limited, but may be polygonal (e.g., hexagonal) or circular.

Next, an example of the invention will be described. It should be noted that the present invention be not limited to the inventive example.

EXAMPLE 1

Material for Formation of Under-Cladding Layer and Over-Cladding Layer

A material for formation of an under-cladding layer and an over-cladding layer was prepared by mixing 35 parts by weight of bisphenoxyethanolfluorene glycidyl ether (component A) represented by the following general formula (1), 40 parts by weight of 3,4-epoxycyclohexenyl methyl 3',4'-epoxyhexenecarboxylate (an alicyclic epoxy CELLOXIDE 2021P manufactured by Daicel Chemical Industries, Ltd.) (component B), 25 parts by weight of an alicyclic epoxy resin having a cyclohexene oxide skeleton (CELLOXIDE 2081 manufactured by Daicel Chemical Industries, Ltd.) (component C), and 2 parts by weight of a 50% propione carbonate solution of 4,4'-bis[di(β-hydroxyethoxy)phenylsulfinio]phenylsulfide bishexafluoroantimonate (component D).

(1)

wherein R1 to R6 are hydrogen atoms, and n=1.

Material for Formation of Cores

A material for formation of cores was prepared by dissolving 70 parts by weight of the aforementioned component A, 30 parts by weight of 1,3,3-tris{4-[2-(3-oxetanyl)]butoxyphenyl}butane and one part by weight of the aforementioned component D in ethyl lactate.

Production of Optical Waveguide

The material for the formation of the under-cladding layer was applied onto a surface of a polyethylene naphthalate (PEN) film (100 mm×100 mm×188 μm (thickness)) by an applicator, and then exposed to ultraviolet radiation at 2000 mJ/cm$^2$. Subsequently, a heat treatment was performed at 100° C. for 15 minutes to form an under-cladding layer (66.3 mm×70.0 mm). The under-cladding layer had a thickness of 20 μm as measured by a contact film thickness meter. Further, the under-cladding layer had a refractive index of 1.542 at a wavelength of 830 nm.

Then, the material for the formation of the cores was applied onto a surface of the under-cladding layer by an applicator, and dried at 100° C. for 5 minutes. In turn, a synthetic quartz chromatic mask (photo mask) having an opening pattern conformable to a core pattern to be formed was placed on the resulting core material film, and the core material film was exposed to ultraviolet radiation emitted from above at 4000 mJ/cm$^2$ by a proximity exposure method. Further, a heat treatment was performed at 80° C. for 15 minutes. Subsequently, a development process was performed by using a γ-butyrolactone aqueous solution to dissolve away unexposed portions, and then a heat treatment was performed at 120° C. for 15 minutes, whereby cores were formed in a rectangular planar frame of an optical waveguide to be produced. The number of cores formed on each edge of the rectangular waveguide was 50. The cores each had a sectional area having a size of 12 μm (width)×24 μm (height) as measured by SEM. The cores each had a refractive index of 1.602 at a wavelength of 830 nm.

Then, the material for the formation of the over-cladding layer was applied by an applicator to cover the cores, and then exposed to ultraviolet radiation at 2000 mJ/cm$^2$. In turn, a heat treatment was performed at 150° C. for 15 minutes, whereby the over-cladding layer (66.3 mm×70.0 mm) was formed. The over-cladding layer had a thickness of 30 μm as measured by the contact film thickness meter. Further, the over-cladding layer had a refractive index of 1.542 at a wavelength of 830 nm.

Thereafter, the resulting product was cut together with the PEN film into a rectangular planar frame shape by a cutting die. Thus, an optical waveguide (having a size of 66.3×70.0 mm and a frame width of the planar frame of 60 mm) fixed to the PEN film was provided.

The optical waveguide thus provided was bonded to a surface of a planar glass epoxy plate with a UV-curable adhesive. At this time, a mating surface was the PEN film. Light emitting cores (cores provided in one of L-shaped planar portions) were connected to light emitting elements (VCSEL), and light receiving cores (cores provided in the other L-shaped planar portion) were connected to light receiving elements (ASIC). As a result, light beams from the light emitting elements were detected through the cores by the light receiving elements.

Thus, it is confirmed that the detection of the light beams can be properly achieved even if the optical waveguide is installed in an ordinary manner (as it is) without the positioning of the light receiving portion. In addition, the same production process as employed for the production of the ordinary optical waveguide can be employed for the production of the optical waveguide, so that the optical waveguide can be produced without the need for provision of additional equipment.

What is claimed is:

1. A touch panel optical waveguide which is to be fitted around a periphery of a display screen of a display of a touch panel, the optical waveguide comprising:
  a unitary planar frame having a shape conformable to the periphery of the display screen of the display to be placed on a surface of the periphery of the display screen of the display, and including frame portions to be disposed in opposed relation on opposite sides of the display screen of the display and respectively having inner surfaces opposed to each other;

light emitting cores provided on one of the frame portions and each light emitting core having an end face exposed on the inner surface of the one frame portion for emitting light beams; and light receiving cores provided on an other of the frame portions disposed in opposed relation to said one frame portion and each light receiving core having an end face exposed on the inner surface of the other frame portion for receiving the light beams emitted from the light emitting cores;

wherein the light emitting cores and the light receiving cores are disposed on a surface of the unitary planar frame along the surface, and the surface of the unitary planar frame provided with the light emitting cores and the light receiving cores is parallel to the display screen of the display, and wherein the unitary planar frame is an under-cladding layer formed of a resin having a lower refractive index than the materials for the formation of the light emitting cores and the light receiving cores.

2. A touch panel optical waveguide which is to be fitted around a periphery of a display screen of a display of a touch panel, the optical waveguide comprising:

a unitary planar frame having a shape conformable to the periphery of the display screen of the display to be placed on a surface of the periphery of the display screen of the display, and including frame portions to be disposed in opposed relation on opposite sides of the display screen of the display and respectively having inner surfaces opposed to each other;

light emitting cores provided on one of the frame potions and each light emitting core having an end face exposed on the inner surface of the one frame portion for emitting light beams; and light receiving cores provided on an other of the frame portions disposed in opposed relation to said one frame portion and each light receiving core having an end face exposed on the inner surface of the other frame portion for receiving the light beams emitted from the light emitting cores;

wherein the light emitting cores and the light receiving cores are disposed on a surface of the unitary planar frame along the surface, and the surface of the unitary planar frame provided with the light emitting cores and the light receiving cores is parallel to the display screen of the display, and wherein the unitary planar frame is a base provided with a thin metal film formed on the surface thereof, and the light emitting cores and the light receiving cores are disposed on a surface of the thin metal film.

* * * * *